(No Model.)
C. T. LAUR.
LIFTING JACK.
No. 436,179. Patented Sept. 9, 1890.
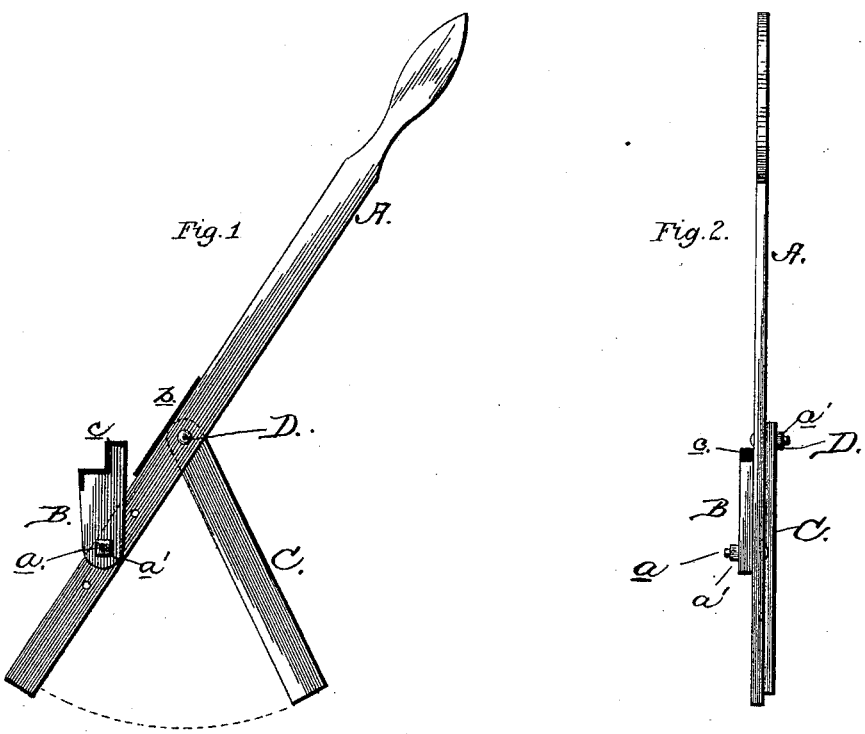
Witnesses
Will T. Norton
S. H. Manton
Inventor
Charles T. Laur.
By his Attorney
Parker N. Street Jr.

UNITED STATES PATENT OFFICE.

CHARLES T. LAUR, OF DE WITT, ARKANSAS.

LIFTING-JACK.

SPECIFICATION forming part of Letters Patent No. 436,179, dated September 9, 1890.

Application filed June 7, 1889. Renewed March 3, 1890. Serial No. 342,495. (No model.)

*To all whom it may concern:*

Be it known that I, CHARLES T. LAUR, a citizen of the United States, and a resident of De Witt, in the county of Arkansas and State of Arkansas, have invented new and useful Improvements in Lifting - Jacks; and I do hereby declare the following to be a full, clear, and exact description of said invention, reference being had to the accompanying drawings, and to the letters of reference marked thereon, which form a part of this specification.

My present invention relates to improvements in wagon-jacks, the object being to provide a cheap, simple, and novel device which can be readily applied for the purpose contemplated, and which shall possess the advantages of being neat, compact, and not liable to get out of order.

To the above ends my improvements consist, essentially, of the novel details of construction and general arrangement of parts, as will hereinafter be fully described, and pointed out in the claims.

In the accompanying drawings, Figure 1 represents a side elevation of my improved device in position ready for use, and Fig. 2 an edge view showing the device in a closed or folded position.

Similar letters of reference indicate like parts in both figures of the drawings.

In carrying out my invention I employ a long lever or bar A, having a suitable handle at its upper end and provided near its lower part with a notched support B, which is adapted to receive and support the front or rear axle of a vehicle, and is pivoted to said long lever by a small bolt $a$ and nut $a'$, as shown. This support B may be provided upon its upper end with a sheathing of strap-iron $c$, and a similar strip of the same material may be attached to the lever A at the point $b$ where the said support contacts with the edge of the same when in operation. An arm or brace C is also pivoted to the long lever A at a point D just above the top of the support B upon the opposite side of the said lever, and projects downward to within an inch of the bottom of said lever when the parts are in a closed or folded position, as shown in Fig. 2. The nuts $a'$ upon the bolts $a$ are arranged in opposite directions upon the said parts, so as to permit of the ready folding or closing of the device when not in use.

In the operation of my invention the long lever A is placed under the vehicle at about an angle of forty-five degrees with the notched recess of the support B beneath the front axle, or the top of the said support beneath the rear axle in a vertical position, and the handle of the lever being pressed forward the elbow formed by the two angles will be straightened to lift the axle up, and the arm C, swinging of its own gravity to a position to contact with the ground, holds the axle up. To lower the axle, the lever is again pressed forward and the arm C thrown back by the foot.

Having thus described my invention, what I claim as new, and desire to secure by Letters Patent, is—

1. A wagon-jack composed of a long lever A, having a notched support B, pivoted upon one side thereof near the lower end, and an arm or brace C, pivoted upon the opposite side of said lever above the notched support, substantially in the manner and for the purpose specified.

2. In a wagon-jack, the long lever or bar A, having a suitable handle at its upper end, and provided near its bottom with a notched support B upon one side, and with a swinging arm or brace C upon the opposite side, which is pivoted to said lever or bar above the said notched support, substantially in the manner and for the purpose specified.

In testimony whereof I affix my signature in presence of two subscribing witnesses.

CHARLES T. LAUR.

Witnesses:
MILLARD F. NORRIS,
PARKER H. SWEET, Jr.